United States Patent Office 3,647,888
Patented Mar. 7, 1972

1

3,647,888
TRIFLUOROMETHYL-p-NITRO DIPHENYL ETHERS
Otto Rohr, Therwil, and Marcus von Orelli, Muenchenstein, Switzerland, assignors to Ciba Limited, Basel, Switzerland
No Drawing. Continuation-in-part of application Ser. No. 680,334, Nov. 3, 1967. This application Apr. 1, 1970, Ser. No. 24,851
Claims priority, application Switzerland, Nov. 11, 1966, 16,260/66
Int. Cl. C07c 43/20
U.S. Cl. 260—612 R    3 Claims

ABSTRACT OF THE DISCLOSURE

The present invention relates to compounds of the general formula

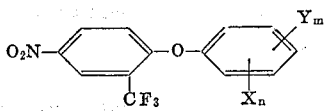

wherein X is a member selected from the group consisting of a halogen atom, an alkyl group having 1 to 4 carbon atoms, the group —$OCH_3$, —$SCH_3$, —$NO_2$ and —$CF_3$, Y is a member selected from the class consisting of a halogen atom and an alkyl group having 1 to 4 carbon atoms, and $n$ and $m$ denote integers from 0 to 3, whose sum is at most 5, as well as to molluscicidal preparations containing such compounds.

CROSS REFERENCE

This is a continuation-in-part of application Ser. No. 680,334, filed Nov. 3, 1967 and now abandoned.

The present invention provides compounds of the general formula

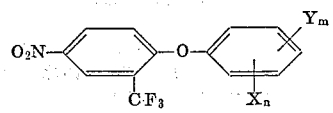

wherein X represents a halogen atom, a lower alkyl group having 1 to 4 carbon atoms or the groups —$OCH_3$, —$SCH_3$, —$NO_2$ or —$CF_3$, Y represents a halogen atom or a lower alkyl group having 1 to 4 carbon atoms and $n$ or $m$ denote integers from 0 to 3 whose sum is at most 5.

The present invention also provides mollusicicidal preparations, which comprise, as active ingredient, a compound of the above mentioned Formula I together with a suitable carrier.

The preparations may contain at least one of the following additives: a solvent, a diluent, a dispersing agent, a wetting agent and an adhesive, as well as other pesticides.

These preparations which contain, as the active substance, the compound of formula

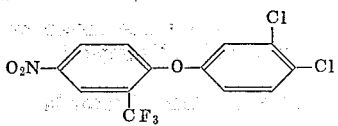

are especially in combatting water snails and have a surprisingly low toxicity to fish.

The invention further provides the following process for the manufacture of the new compounds of Formulae I and II.

The new compounds of general Formula I are manufactured by reacting 2-chloro-5-nitrobenzotrifluoride with a compound of general formula

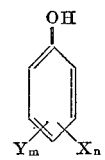

wherein X, Y, $n$ and $m$ have the significance given above for the case of the general Formula I, with elimination of hydrogen chloride and in the presence of an acid acceptor, preferably an alkali hydroxide, optionally in a polar solvent, at a temperature within the range of from 0° to 200° C.

The compounds of general Formula I all exhibit an excellent effect against molluscs and their eggs.

The preparations according to the invention may be used in the most diverse application forms. Possible substances for the manufacture of directly sprayable solutions of the compounds of general Formula I are, for example, mineral oil fractions of high to medium boiling range, preferably having a boiling range above 100° C., for example, Diesel oil or kerosene, coal tar oils and oils of vegetable or animal origin, as well as hydrocarbons, for example, alkylated naphthalenes and tetrahydronaphthalene, optionally with the use of xylene mixtures, cyclohexanols, ketones, and furthermore chlorinated hydrocarbons, for example, trichloroethane and tetrachlorethane, trichlorethylene or trichlorobenzenes and tetrachlorobenzenes.

Aqueous application forms are, for example, prepared from emulsion concentrates, pastes or wettable spraying powders by adding water. Possible emulsifiers or dispersing agents are, for example, non-ionic products, for example, condensation products of aliphatic alcohols, amines or carboxylic acids having a long chain hydrocarbon residue containing about 10 to 12 carbon atoms, with ethylene oxide, for example the condensation product of octadecyl alcohol and 25 to 30 mols of ethylene oxide or that of soya fatty acid and 30 mols of ethylene oxide or that of commercial oleylamine and 15 mols of ethylene oxide or that of dodecylmercaptan and 12 mols of ethylene oxide. Amongst the anionic emulsifiers which may be used, there may be mentioned; the sodium salt of dodecyl alcohol sulphuric acid ester, the sodium salt of dodecylbenzenesulphonic acid, the potassium or triethanolamine salt of oleic acid or of abietic acid or of mixtures of these acids or the sodium salt of a petroleum sulphonic acid. Cationic dispersing agents that may be used are quaternary ammonium compounds, for example, cetyl pyridinium bromide, or dihydroxyethylbenzyl dodecyl ammonium chloride.

In order to prepare dusting and scattering agents, talc, kaolin, bentonite, calcium carbonates, calcium phosphate, and also charcoal, cork powder, wood flour and other materials of vegetable origin may be used as solid carriers. It is also very advantageous to manufacture the preparations in a granulated form. The various application forms may be provided with the addition of substances which improve the distribution, adhesion, rain resistance or penetrating power, in the usual manner. As such substances there may be mentioned fatty acids, resins, glue, casein or alginates.

The preparations according to the invention may be used by themselves or together with conventional pesticides, such as insecticides, acaricides, nematocides, bactericides, fungicides and/or herbicides.

In the following examples, which illustrate the invention, the parts denote parts by weight unless otherwise stated, and the percentages denote percentage by weight.

EXAMPLE 1

32.6 g. of 3,4-dichlorophenol are dissolved in 50 ml. of dimethylformamide in a flask provided with a stirrer. This solution is mixed with 11.2 g. of potassium hydroxide dissolved in 10 ml. of water and 49.6 g. of 2-chloro-5-nitro-benzotrifluoride are thereafter added drop by drop. The reaction mixture is heated to reflux temperatures (sic) for 2 hours and is then subjected to a steam distillation. The oily residue is extracted with ether. After distilling off the solvent, crystals having a melting point of 97°–99° C. are obtained.

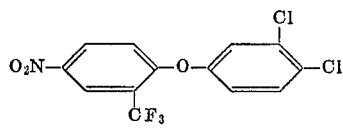

The following compounds were also manufactured in a similar manner.

| No. | R= | Property |
|---|---|---|
| 1 | O₂N—⟨⟩(CF₃)—O—R | |
| 2 | —⟨⟩ | Boiling point (0.02), 113°–123°. |
| 3 | —⟨⟩—Cl | Melting point, 70°–72°. |
| 4 | —⟨⟩(Cl)—Cl | Melting point, 73°–77°. |
| 5 | —⟨⟩(CH₃)—Cl | Melting point, 68°–70°. |
| 6 | —⟨⟩(CH₃)—Cl | Boiling point (0.03), 122°–128°. |
| 7 | —⟨⟩(CH₃)(CH₃)—Cl | Melting point, 141°–147°. |
| 8 | —⟨⟩—CH₃ | Melting point, 49°–52°. |
| 9 | —⟨⟩—OCH₃ | Melting point, 70°–72°. |
| 10 | —⟨⟩—Br | Melting point, 54°–55°. |
| 11 | —⟨⟩(Cl) | Boiling point (0.03), 131°–134°. |
| 12 | —⟨⟩(CH₃)(CH₃) | Melting point, 58°–60°. |
| 13 | —⟨⟩(Cl)(Cl)—Cl | Boiling point (0.02), 152°–158°. |
| 14 | —⟨⟩—NO₂ | Melting point, 72°–73°. |
| 15 | —⟨⟩(CH₃) | Boiling point (0.02), 123°–129°. |
| 16 | —⟨⟩(CH₃)—SCH₃ | Boiling point (0.3), 174°–178°. |
| 17 | —⟨⟩(CH₃)—NO₂ | Melting point, 135°–137°. |
| 18 | —⟨⟩(CF₃) | Melting point, 60°–62°. |
| 19 | —⟨⟩(CF₃)—Cl | Melting point, 76°–78°. |
| 20 | —⟨⟩—NO₂ | Melting point, 97°–101°. |
| 21 | —⟨⟩(NO₂)—CH₃ | Melting point, 123°–129°. |
| 22 | —⟨⟩—SCH₃ | Boiling point (0.05), 160°–170°. |
| 23 | —⟨⟩(CH₃) | Boiling point (0.001), 132°–135°. |

EXAMPLE 2

10 parts of one of the compounds according to Example 1 are in each case mixed with 15 parts of isooctyl-phenyl-polyethoxy-ethanol and diluted to 100 cm.³ with acetone.

A clear solution was obtained, which was used as a spraying material concentrate and which could be emulsified by being poured into water.

EXAMPLE 3

Snails (*Australorbis glabratus*) having a shell diameter of 10–12 mm. are exposed for 24 hours to an emulsion of the active substance, manufactured according to Example 2. After exposure, they are kept in clean water for 48 hours and are fed. The effect was examined after this recovery time. At the concentration stated in the table which follows, the snails were 100% killed.

| Compound according to Example 1: | Concentration in p.p.m. |
|---|---|
| No. 1 | 0.2–0.4 |
| No. 4 | 3 |
| No. 12 | 3 |

A similar good effect was also shown by the remaining compounds described in Example 1.

We claim:

1. Compounds of the general formula

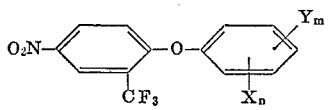

wherein X is a member selected from the group consisting of a halogen atom, an alkyl group having 1 to 4 carbon atoms, the group —OCH₃, —SCH₃, —NO₂ and —CF₃, Y is a member selected from the class consisting of a halogen atom and an alkyl group having 1 to 4 carbon atoms, and $n$ and $m$ denote integers from 0 to 3, whose sum is at most 5.
2. The compound as claimed in claim 1 having the formula
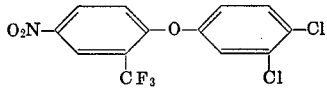
3. The compound as claimed in claim 1 having the formula
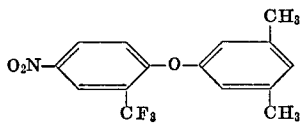
References Cited
UNITED STATES PATENTS
| | | | |
|---|---|---|---|
| 3,420,892 | 1/1969 | Martin et al. | 260—612 |
| 2,464,877 | 3/1949 | Markarian et al. | 260—612 |
| 3,506,720 | 4/1970 | Model et al. | 260—613 |
| 3,558,720 | 1/1971 | Schmidt-Collerus et al. | 260—612 |
BERNARD HELFIN, Primary Examiner
U.S. Cl. X.R.
260—609 F, 613 R; 424—340, 337, 341